Feb. 23, 1965 C. S. COFFEY 3,171,044
HIGH-SPEED GATE CIRCUIT
Filed Sept. 12, 1962
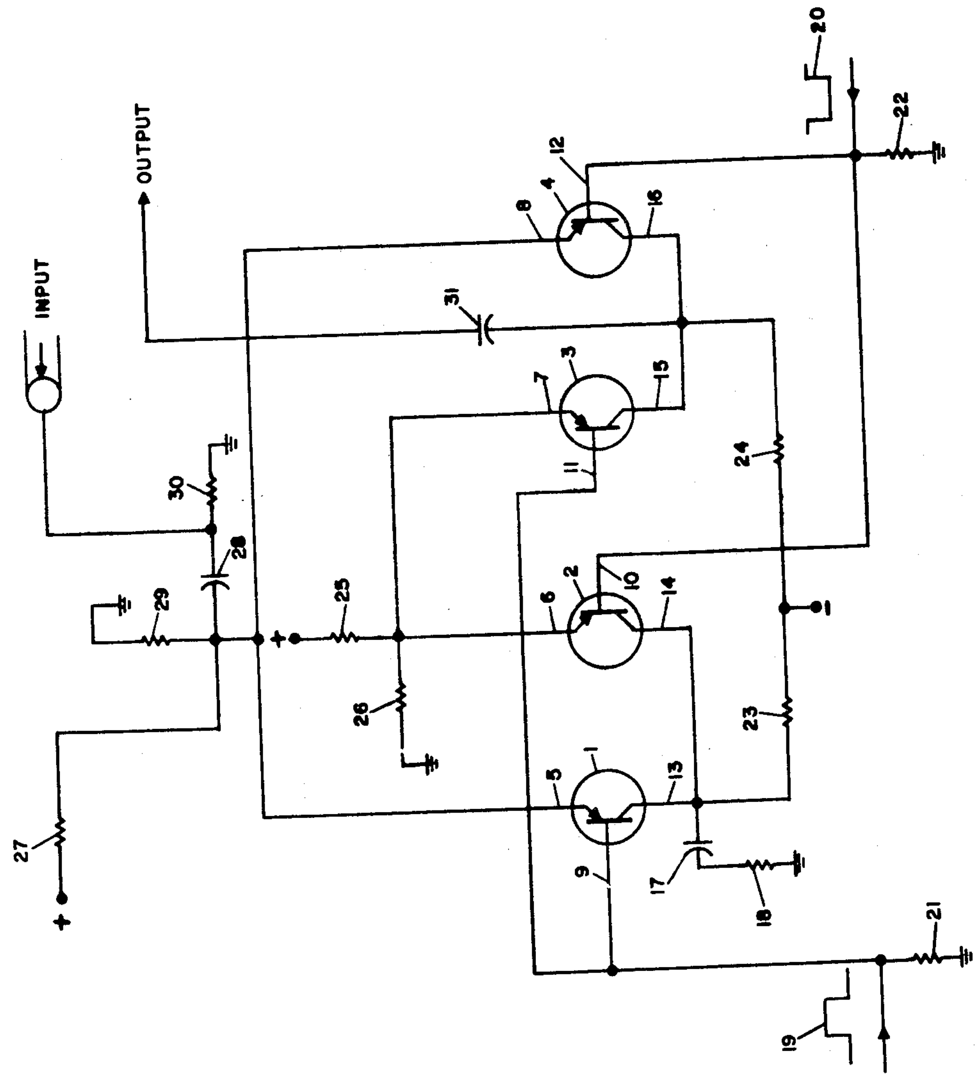
INVENTOR
CHARLES S. COFFEY
BY Cadwallader and Kelly
ATTORNEYS 3,171,044
Patented Feb. 23, 1965

3,171,044

HIGH-SPEED GATE CIRCUIT

Charles S. Coffey, New Brunswick, N.J., assignor to Edgerton, Germeshausen & Grier, Inc., Boston, Mass., a corporation of Massachusetts Filed Sept. 12, 1962, Ser. No. 223,178
11 Claims. (Cl. 307—88.5)

This invention relates generally to switching circuits and more particularly to electronic switching circuits capable of operation at very high frequencies.

There are many uses for such a circuit in the electronic arts. One example is in a system which measures electronic time or electrical length of a cable. Such a system employs a pulser which feeds a pulse into the input of the cable and to a flip-flop which turns on a gate circuit designed according to the principles of my invention, thereby allowing signals from a signal generator to pass to a counting circuit. The pulse that is sent down the cable reflects back to the flip-flop which turns off the gate circuit stopping the signals from reaching the counting circuit. The number of cycles counted are converted into units of time. This time measurement indicates the transit time for the pulse to pass the full length of the cable and return back to the input point. One-half of this time is a measurement of the electrical length of the cable. The accuracy of such a system may be improved, of course, by increasing the frequency of the signal generated, but this increase is limited by the frequency response of the gate. Another inherent disadvantage of prior art gating circuits is the time delay in turning the gate circuit from the on to the off state.

Still another limitation of present day switching circuits resides in the fact that during the switching operation, they generate transients that are mistaken for signals to be counted thereby further decreasing the accuracy of the measuring system.

There are, indeed, many other applications for this gating circuit. It may be used in any electronic system in which it is desired to transfer a signal from one output to another without creating prohibitive transient signals. It is very useful in computer circuits for purposes such as AND gates or, OR gates.

It is, therefore, the primary object of my invention to provide a substantially transient-free switching circuit.

Another object of my invention is to provide a switching circuit capable of operation at extremely high frequencies.

A further object of this invention is to provide a gate circuit which has a very short switching time. In summary, my invention comprises a pair of similar unidirectional devices connected in parallel to a source of input signals and there is connected to each device an output circuit whose impedances are substantially equal. Gating means are provided for controlling through which of the parallel paths the input signals flow. Voltages are generated by the gating means which are simultaneously applied to the devices to switch the input signals from one of the parallel paths to the other. Means are provided for insuring substantially constant and equal potentials in both output circuits to prevent the generation of transients during switching. Further objects of this invention are hereinafter set forth in the following specifications and more particularly in the appended claims.

A better understanding of the novelty of my invention will be had from the following description in conjunction with the accompanying drawing, the single figure of which is a schematic diagram of the preferred embodiment of this invention.

Two major causes of generating transient signals during the switching operation of a gate circuit are: (1) the input signal sees two different impedances during switching; and (2) the operating potentials within the circuit are not held constant during the switching operation thereby introducing transient signals. The following discussion of the preferred embodiment of my invention will show how the creation of transients can be greatly reduced and a new, novel and highly efficient gating circuit may be made.

Referring now to the accompanying drawing, four similar transistors 1, 2, 3 and 4 are shown. It is preferable, although not essential, that all the transistors are similar. Transistors 1 and 4 and transistors 2 and 3 constitute two separate pairs. The former pair provides alternate paths for the input signal; the latter pair keeps the voltage at the outputs constant. The emitters 5 and 8 of transistors 1 and 4, respectively, are connected through coupling capacitor 28 to a source of input signals indicated as INPUT. For purposes later discussed, emitters 5 and 8 are also connected through resistor 29 to ground. Emitters 5 and 8 are also connected to a substantially constant current source indicated by resistor 27 and positive voltage supply +. The emitters 6 and 7 of transistors 2 and 3, respectively, are also connected to a constant current source comprising resistor 25 and positive voltage supply +. The collectors 13 and 14 of transistors 1 and 2, respectively, are connected to an output load consisting of capacitor 17 and resistor 18. This output load may, as shown in this embodiment, be a dummy load which is very useful in applications where the primary purpose of the gating circuit is to switch the input signal into a particular output circuit for a given time, but where the output is unimportant during other times. Such an application is the measurement of the electrical length of the cable in the example given above. A negative power supply — is connected to collectors 13 and 14 through biasing resistor 23, to form a constant current source for the purpose of reverse biasing the collector-base junctions of transistors 1 and 2. The collectors 15 and 16 of transistors 3 and 4, respectively, are connected to the OUTPUT through coupling capacitor 31. The negative power supply — is connected through biasing resistor 24 to collectors 15 and 16 to reverse bias the collector-base junctions of these transistors. The bases 9 and 11 of transistors 1 and 3, respectively, are connected to a source of gating pulses one of which can be represented by 19, while the bases 10 and 12 of transistors 2 and 4 are similarly connected to a source of gating pulses similar to 20 which are of the opposite polarity as gating pulse 19. A source of the gating pulses may be a multivibrator such as disclosed in my U.S. patent application Serial No. 217,095, filed on August 15, 1962, now Patent No. 3,144,565.

In considering the operation of the circuit, we shall, for simplicity, speak of the gate circuit as being "off" when the input signal is being fed through transistor 1 to the dummy load, and "on" when the input signal is being directed through transistor 4 to the output circuit. Let us first consider the operation of the circuit when the gate is "off", that is, the input signal is being fed through transistor 1 to the dummy load consisting of capacitor 17 and resistor 18. At this time, transistors 1 and 3 are conducting and transistors 2 and 4 are nonconducting. Due to the conduction of transistor 1 and its connection to the aforementioned constant current sources, the conductors intermediate the collector 13 and capacitor 17 will be at a constant D.-C. potential. It should also be noted that at the point intermediate the collector 15 of transistor 3, and capacitor 31, the D.-C. potential will again be constant due to the effect of the constant current sources connected to conducting transistor 3.

To switch the gate from its "off" state to the "on" state, a negative voltage 20 is applied to the bases 10 and 12 of transistors 2 and 4, respectively, thereby forward biasing the emitter-base junctions of these transistors and rendering them conductive. Simultaneously, a positive voltage 19 is coupled to bases 9 and 11 of transistors 1 and 3, respectively, thereby shutting these transistors off. When the gate circuit is switched to the "on" state, the input signal now flows through conducting transistor 4 to its output circuit. In changing its path from transistor 1 and the dummy circuit to transistor 4 and the output circuit, the input signal sees no change in circuit impedance and therefore, realistically no transients are generated by the switch from the first path to the second path. The point intermediate the collector 13 of transistor 1 and capacitor 17 which was held constant in the "off" state, is still maintained constant by transistor 2 which is also connected to the same constant current potential as was transistor 1 while it was conducting. For this reason, there is no change in D.-C. voltage at this junction to the output dummy load, and the absence of any voltage change insures that there will be no transients generated at this point. Similarly, the constant D.-C. voltage at the point intermediate the collector 15 of transistor 3 and capacitor 31 in the output circuit is maintained substantially constant because of the aforementioned constant current sources which are connected to conducting transistor 4 whose collector 16 is connected to the common intermediate point in the output circuit.

To turn the gate to the "off" state, a negative voltage is applied to the bases of transistors 1 and 3 rendering them conductive and a positive voltage is simultaneously coupled to the bases of transistors 2 and 4 rendering these transistors nonconductive. The absence of any change in the impedance seen by the input signal and the absence of any change in the voltage in the circuits, will prevent the generation of any transients during this switching operation.

In summary, during the switching operation, whether it be from the "on" state to the "off," or from the "off" state to the "on," the input signal sees no change in impedance, thereby greatly reducing the generation of transients. Further, the voltages in each circuit remain constant because there are no changes in the current flow in the heretofore described common points. Of course, the absence of voltage changes insures that there will be a substantial reduction of transients generated. A further advantage of the constant voltage at these points is that energy storage problems during gating are eliminated, thereby greatly reducing the switching time. The switching time of my described circuit is of the order of one nanosecond.

Another advantage of the above-described circuit resides in the fact that the bases of the transistors, whose emitters are connected to the signal source, are referenced through a small resistance to ground. Thus, the signal to be gated is effectively channeled through common base amplifiers resulting in a gate with excellent frequency response.

This gate circuit will operate at a wide range of frequencies, but it is pointed out that my gate is capable of gating one cycle in 300 megacycles with a minimum of distortion. An indication of the reduction of this distortion is that transients generated are at least 36 db down as compared to a 0.6 v. input signal.

Typical circuit parameters and voltages of my illustrative embodiment are as follows:

| | |
|---|---|
| **1, 2, 3, 4** | Philco 2N769. |
| **21, 22** | 150 ohms. |
| **23, 24** | 1.6K ohms. |
| **26, 29** | 100 ohms. |
| **17, 31** | 15 picofarads. |
| **25, 27** | 2.2K ohms. |
| **28** | 25 picofarads. |
| **18** | 150 ohms. |
| **30** | 50 coaxial line. |
| Positive voltages (+) | +22 volts. |
| Negative voltages (−) | −22 volts. |

Although the foregoing discussion describes one specific circuit, modifications can be made without departing from the spirit or the scope of my invention. It should be noted that when there is no gating pulse applied to the transistors, all of the transistors are conducting and the gate circuit is in neither the aforementioned "off" nor "on" states. The component values of the circuit may be changed so that the gate circuit is normally "off" or normally "on" while there is no gate signal present.

Also resistors 26 and 29 are not essential to the operation of my gate. Because of the near impossibility to manufacture transistors which have identical characteristics, said resistors are used to minimize these differences thereby insuring more equal impedances in my gate circuit when similar transistors cannot be obtained.

While my discussion has centered about the use of PNP transistors, it is obvious that they may be replaced with NPN transistors by merely reversing the polarity of the voltage supplies. Furthermore, electron tubes may be used in place of transistors, as may diodes, or any other electronic device possessing unidirectional characteristics and which may be rendered conducting or nonconducting in response to gating impulses of a predetermined polarity.

I claim:

1. A high-speed gate circuit comprising:
two pairs of unidirectional devices possessing similar characteristics;
a source of high frequency input signals in excess of 100 megacycles coupled to the first of said pair of devices;
first and second output circuits of substantially equal impedance, the first output circuit being connected to one of the devices of each pair and the second output circuit being connected to the other devices of each pair;
means for rendering a first set of two of said devices conductive and a second set of the two remaining devices nonconductive, the two devices in each set being connected to different output circuits and each set having one of the said first pair of devices so that the input signal is fed to the output circuit connected to the conductive device of the first pair;
means for substantially simultaneously switching the input signal from one output circuit to the other by making the conductive devices nonconducting and the nonconductive devices conducting; and
means for maintaining similar points between each output circuit and the devices connected thereto at substantially constant and equal potentials.

2. A high-speed gate circuit comprising:
two pairs of unidirectional devices possessing similar characteristics and having input, control and output electrodes;
a source of high frequency input signals in excess of 100 megacycles coupled to the input electrodes of the first of said pair of devices;
first and second output circuits of substantially equal impedance, the first output circuit being connected to the output electrode of one device in each pair and the second output circuit being connected to the output electrodes of the other devices;
means for connecting the control electrodes of a first set of two of said devices to a source of gating impulses to render the same conducting;
means for connecting the control electrodes of a second set of the two remaining devices to a source of gating impulses to render the same nonconducting, the two devices in each of said sets being connected to different output circuits and each set having one of the said first pair of devices, said sources subsequently producing substantially simultaneous gating signals, opposite in polarity to the previous gating signals for rendering the conductive devices nonconducting and the nonconductive devices conducting thereby switching the input signals from one output circuit to the other; and means for maintaining similar points between each output circuit and the devices connected thereto at substantially constant and equal potentials.

3. A high-speed gate circuit comprising:

a pair of transistors possessing similar characteristics and having emitter, base and collector electrodes;

a source of high frequency input signals in excess of 100 megacycles coupled to the emitters of each transistor;

a pair of output circuits of substantially equal impedance each being connected to the collector of a different transistor;

means for connecting the base of each transistor to a source of gating impulses of such polarity that one transistor is rendered conducting and the other transistor is rendered nonconducting, said source subsequently producing substantially simultaneously gating signals opposite in polarity to the previous gating signals for rendering the conductive transistor nonconducting and the nonconductive transistor conducting thereby switching the input signals from one output circuit to the other; and means for maintaining similar points intermediate the collector of each device and the output circuit connected thereto at substantially constant and equal potentials.

4. A high-speed gate circuit comprising:

two pairs of transistors possessing similar characteristics and having emitter, base and collector electrodes;

a source of high frequency input signals in excess of 100 megacycles coupled to the emitters of the first of said pair of transistors;

first and second output circuits of substantially equal impedance, the first output circuit being connected to the collectors of one transistor in each pair and the second output circuit being connected to the collectors of the other transistor;

means for connecting the bases of a first set of two of said transistors to a source of gating impulses to render the same conducting;

means for connecting the bases of a second set of the two remaining transistors to a source of gating impulses to render the same nonconducting, the two transistors in each of said sets being connected to different output circuits and each set having one of the said first pair of transistors, said sources subsequently producing substantially simultaneously gating signals, opposite in polarity to the previous gating signals for rendering the conductive transistors nonconducting and the nonconductive transistors conducting thereby switching the input signals from one output circuit to the other; and means for maintaining similar points between each output circuit and the transistors connected thereto at substantially constant and equal potentials.

5. A high-speed gate circuit comprising:

two pairs of transistors possessing similar characteristics having emitter, base and collector electrodes;

a source of high frequency input signals in excess of 100 megacycles coupled to the emitters of the first of said pair of transistors;

first and second output circuits of substantially equal impedance, the first output circuit being connected to the collectors of one transistor in each pair and the second output circuit being connected to the collectors of the other transistors;

means for connecting the bases of a first set of two of said transistors to a source of gating impulses to render the same conducting;

means for connecting the bases of a second set of the two remaining transistors to a source of gating impulses to render the same nonconducting, the two transistors in each of said sets being connected to different output circuits and each set having one of the said first pair of transistors, said sources subsequently producing substantially simultaneous gating signals, opposite in polarity to the previous gating signals for rendering the conductive transistors nonconducting and the nonconducting transistors conducting thereby switching the input signals from one output circuit to the other; and means for connecting each transistor to similar sources of operating potentials to maintain similar points between each output circuit and the transistors connected thereto at substantially constant and equal potentials.

6. A high-speed gate circuit as claimed in claim 5 and in which one of said output circuits is a dummy load.

7. A high-speed gate circuit comprising:

(1) a pair of symmetrical circuits having:

(*a*) a pair of transistors possessing similar characteristics having emitter, base and collector electrodes;

(*b*) means for connecting the emitter of one transistor to a common source of high frequency input signal in excess of 100 megacycles;

(*c*) an output circuit connected to the collectors of each transistor; and (*d*) means for connecting each transistor to similar sources of operating potentials;

(2) means for connecting the bases of a first set of two of said transistors to a source of gating impulses to render the same conducting; and (3) means for connecting the bases of a second set of the two remaining transistors to a source of gating impulses to render the same nonconducting, the two transistors in each of said sets being selected one from each of said pairs and each set having one transistor connected to the source of input signals, said sources of gating impulses subsequently producing substantially simultaneous gating signals, opposite in polarity to the previous gating signals for rendering the conductive transistors nonconducting and the nonconductive transistors conducting thereby switching the input signals from one output circuit to the other.

8. A high-speed gate circuit as claimed in claim 7 and in which one of said output circuits is a dummy load.

9. A high-speed gate circuit comprising two pairs of unidirectional devices possessing similar characteristics and arranged in two sets, a source of high frequency input signals in excess of 100 megacycles coupled to one of said devices in each of said two sets, a first output circuit coupled to two of said devices with one of said devices being from one of said two sets and the other being from the other of said two sets, said first output circuit being referenced to ground, a second output circuit coupled to the remaining two of said devices with one of said devices being from one of said two sets and the other being from the other of said two sets, said second output circuit being connected to the output of said high-speed gate circuit, means for alternately making one set of said two sets of devices conductive and the other set of said two sets of devices nonconductive, and means for maintaining like points between said first output circuit and said second output circuit and their respective said devices coupled thereto at substantially constant and equal potentials.

10. A high-speed gate circuit comprising a pair of transistors possessing similar characteristics and having emitter, base and collector electrodes respectively, a source of high frequency input signals in excess of 100 megacycles coupled to the emitters of each of said pair of transistors, a first output circuit coupled to the collector of one of said pair of transistors and being referenced to ground, a second output circuit coupled to the collector of the other of said pair of transistors and being also coupled to the output of said high-speed gate circuit, said first output circuit and said second output circuit having substantially equal impedance, means for alternately making one of said pair of transistors conductive and the other of said pair of transistors nonconductive, and means for maintaining like points between each of said pair of transistors and their said respective output circuits at substantially constant and equal potentials.

11. A high-speed gate circuit comprising two pairs of transistors possessing similar characteristics and having emitter, base and collector electrodes respectively and being arranged in two sets, a first set and a second set, a source of high frequency input signals in excess of 100 megacycles coupled to the emitter of one of said transistors of said first set and to the emitter of one of said transistors of said second set, a first output circuit coupled to the collectors of two of said transistors with one of said transistors being from said first set and the other being from said second set, said first output circuit being referenced to ground, a second output circuit coupled to the collectors of the other two of said transistors with one of said transistors being from said first set and the other being from said second set, said second output circuit being also coupled to the output of said high-speed gate circuit, said first output circuit and said second output circuit having substantially equal impedance, means for connecting the bases of said transistors of said first set to a source of gating pulses of one polarity, means for connecting the bases of said transistors of said second set to a source of gating pulses of opposing polarity, and means for maintaining like points between each of said pair of transistors and their said respective output circuits at substantially constant and equal potentials.

References Cited by the Examiner

UNITED STATES PATENTS

| | | | |
|---|---|---|---|
| 2,997,605 | 8/61 | Fortini | 307—88.5 |
| 3,031,588 | 4/62 | Hilsenrath | 307—88.5 |

JOHN W. HUCKERT, *Primary Examiner.*

ARTHUR GAUSS, *Examiner.*